United States Patent [19]

Gilbert

[11] Patent Number: 4,821,824

[45] Date of Patent: Apr. 18, 1989

[54] AUXILIARY TRACTION SYSTEM

[76] Inventor: Lloyd Gilbert, 4865 S. Ravenna Rd., Ravenna, Mich. 49451

[21] Appl. No.: 152,334

[22] Filed: Feb. 4, 1988

[51] Int. Cl.⁴ ............................................. B62D 55/02
[52] U.S. Cl. .................................. 180/9.28; 180/9.32; 180/9.34; 180/9.42; 180/185; 301/41 R; 305/15; 305/16
[58] Field of Search ............... 180/9, 9.1, 9.28, 9.3, 180/9.32, 9.34, 9.36, 9.42, 6.7, 9.21, 185, 190, 900, 16; 280/5.22; 301/41 R, 38 R, 39 R, 40 R, 40 S; 305/6, 21, 15, 16

[56] References Cited

U.S. PATENT DOCUMENTS

| | | | |
|---|---|---|---|
| 1,437,408 | 12/1922 | Estes | 180/185 |
| 1,729,374 | 9/1929 | Ehrhart | 180/9.26 |
| 2,051,496 | 8/1936 | Sarrazin | 180/9.3 |
| 3,863,726 | 2/1975 | O'Brien | 180/185 |
| 3,976,153 | 8/1976 | Lateur | 180/9.21 |
| 4,301,884 | 11/1981 | Taylor | 180/190 |
| 4,448,273 | 5/1984 | Barbieri | 180/9.21 |
| 4,598,783 | 7/1986 | Tippen | 180/9.32 |
| 4,613,006 | 9/1986 | Moss | 180/190 |
| 4,719,983 | 1/1988 | Bruzzone | 180/185 |

FOREIGN PATENT DOCUMENTS

| 1365420 | 5/1963 | France | 301/38 R |
|---|---|---|---|
| 191383 | 6/1937 | Switzerland | 301/38 R |

Primary Examiner—Charles A. Marmor
Assistant Examiner—Everett G. Diederiks, Jr.
Attorney, Agent, or Firm—Waters, Morse & Harrington

[57] ABSTRACT

An attachment for tractors is mounted on the tractor frame, and provides an endless track system for supporting and driving the tractor through power supplied with chains engaging sprockets secured to the conventional drive wheels. The position of the track system permits it to remain elevated until the main drive wheels settle down into soft ground. The track speed is established at the effective peripheral velocity of the drive wheels.

4 Claims, 8 Drawing Sheets

AUXILIARY TRACTION SYSTEM

BACKGROUND OF THE INVENTION

Farming activity that involves moving heavy equipment over the land is somewhat at the mercy of the weather. A long period of heavy rain at harvest time will often make the ground conditions impossible for the equipment. A farmer can be forced to watch the ruin of a crop worth hundreds of thousands of dollars. These conditions are usually not regular enough to justify the expense of bulldozer-type vehicles, when compared to the cost of the conventional four-wheel farm tractor.

Attempts have been made to combine the economy of the usual tractor with an endless track system of modest proportions. This idea is excellent, but only on the assumption that the unit (a) performs well, (b) is easily attached to the tractor, and (c) can be made available at a reasonable cost. The unit should be readily removed so that it does not get in the way, or continue to be subject to wear when it is not needed. It has been recognized that the best approach to the design of these auxiliary traction systems is to locate the track units so that they remain elevated until the usual drive wheels begin to sink seriously into soft ground. This arrangement retains the tractor's ability to operate at higher speeds on the harder road surfaces. The present invention is directed at satisfying these requirements.

SUMMARY OF THE INVENTION

The endless track system provided by this invention is preferably bolted to the tractor chassis, and derives power from chain drives connecting the tracks to sprocket attachments secured to the inside of the conventional drive wheels. The system is thus accommodated between the drive wheels, and is influenced by the tractor differential. The power transfer generates a track velocity equal to the effective peripheral velocity of the drive wheels, so that there is no significant velocity conflict. The track system has its own frame providing support for the tracks. The placement of the system in the front-rear direction is selected to provide less weight on the front wheels of the tractor than when the tractor is primarily supported by the rear drive wheels. This arrangement tends to eliminate any tendency for the tractor to dive as it encounters soft ground.

DESCRIPTION OF THE PREFERRED EMBODIMENT

Figure 1:
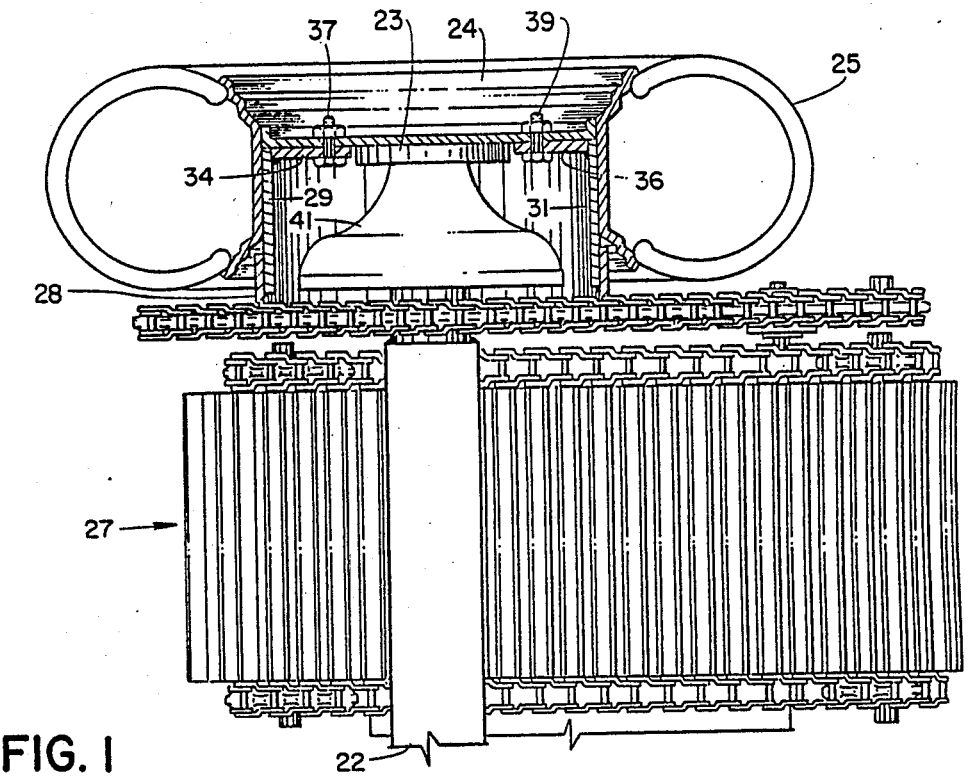
FIG. 1 is a top view, showing one side of the auxiliary traction system.
Figure 2:
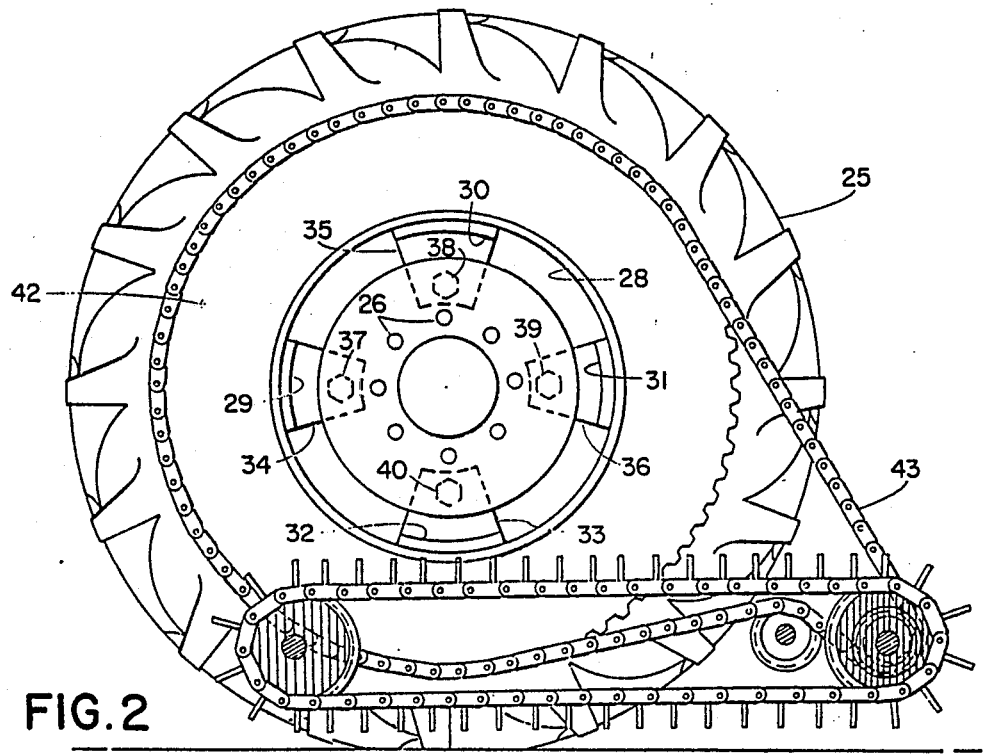
FIG. 2 is a side elevation of the mechanism illustrated in FIG. 1.
Figure 3:
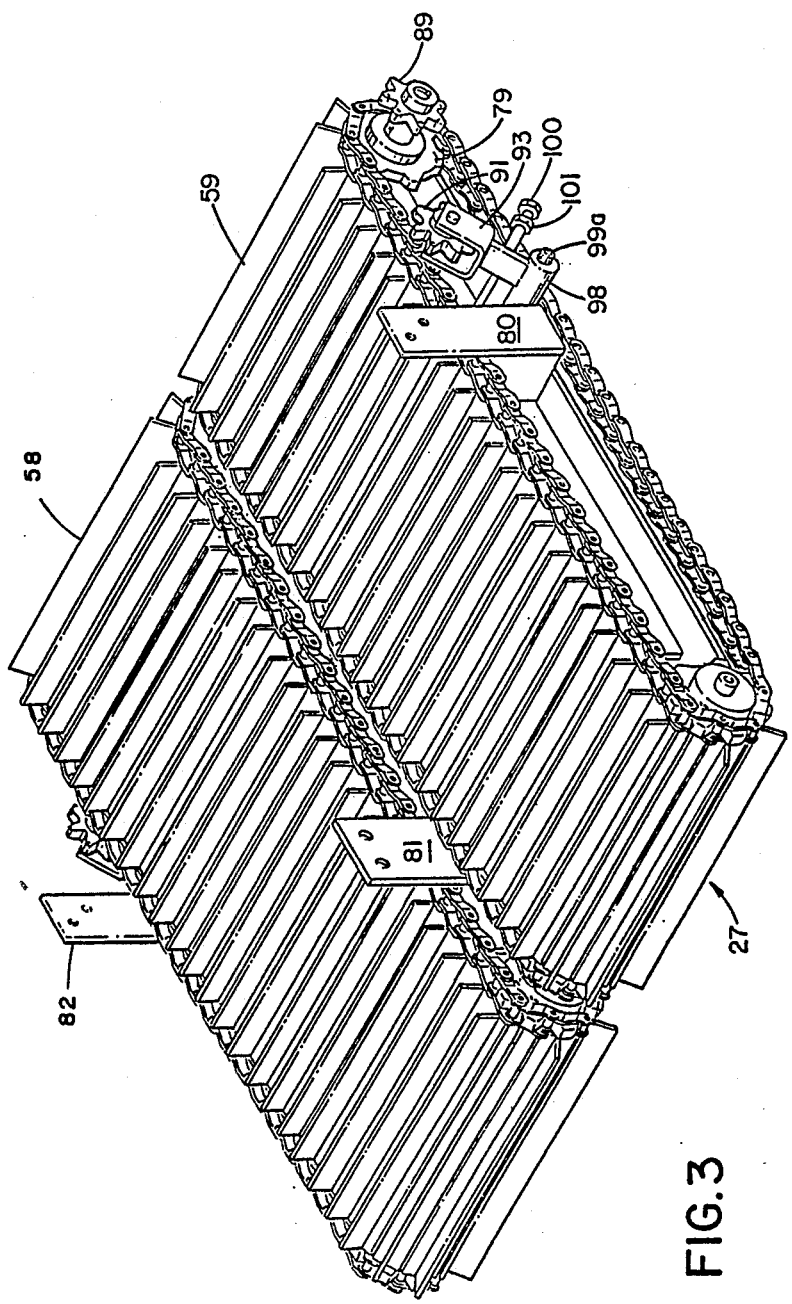
FIG. 3 is a perspective view showing one side of the traction unit apart from the tractor vehicle.
Figure 4:
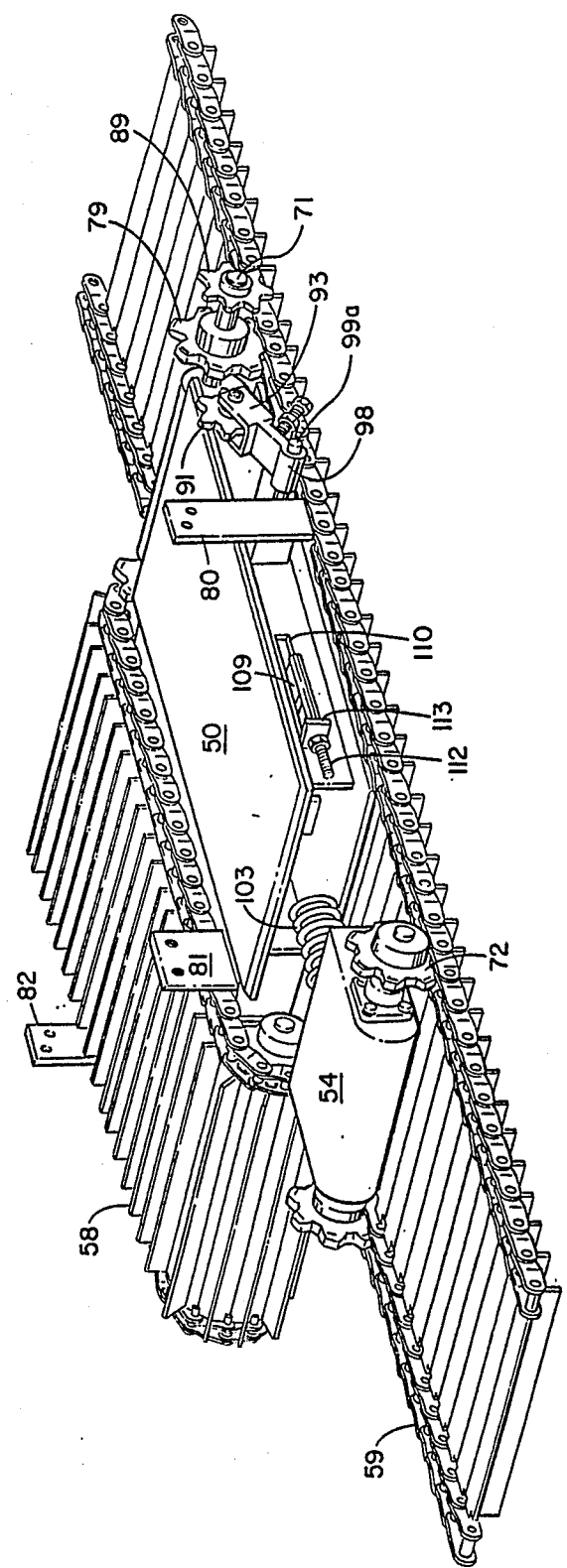
FIG. 4 is a view in perspective of the traction unit, with the endless track on one side opened up and laid out to expose the interior structure.
Figure 5:
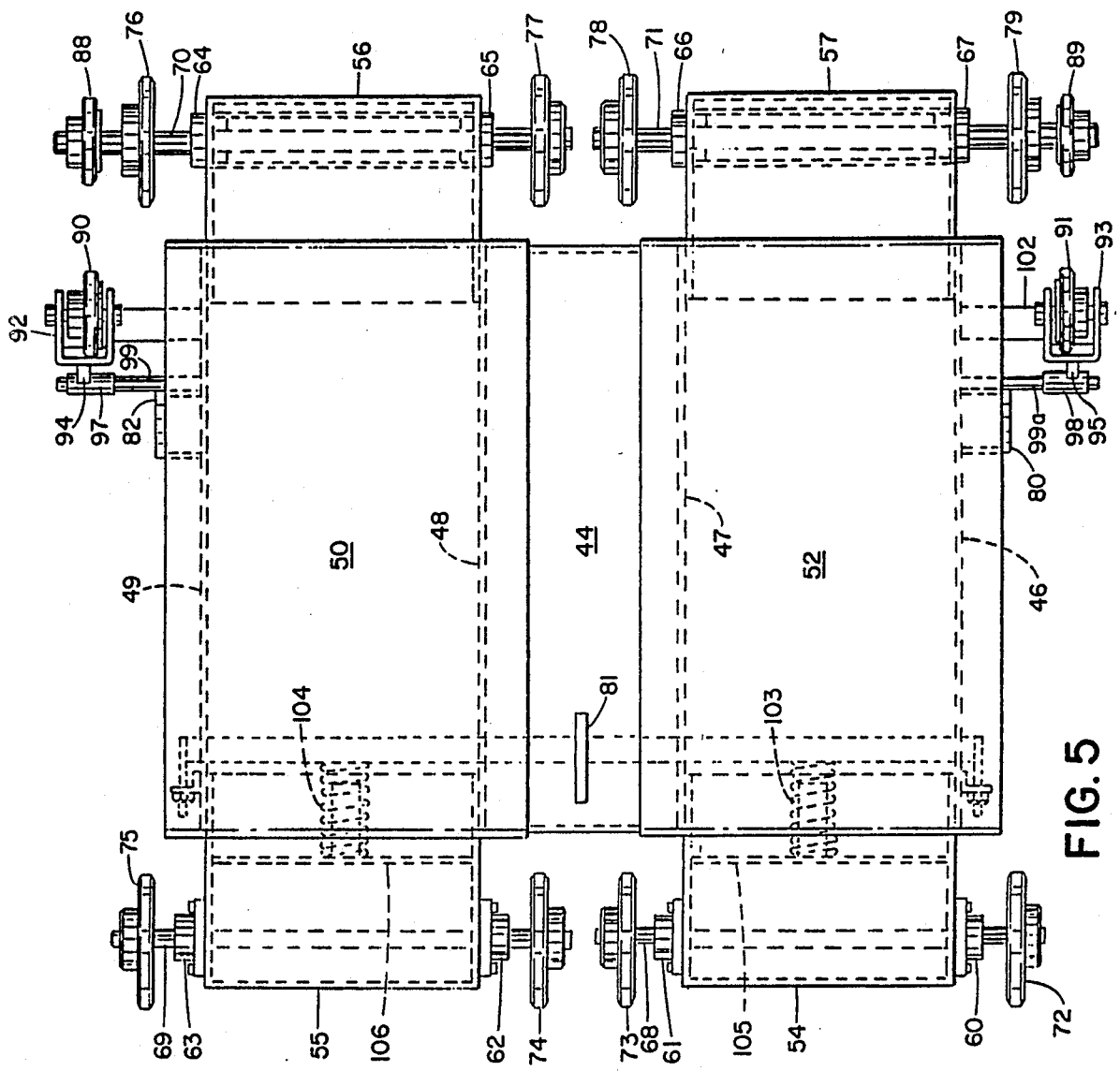
FIG. 5 is a plan view of the auxiliary traction unit, with the endless tracks removed.
Figure 8:
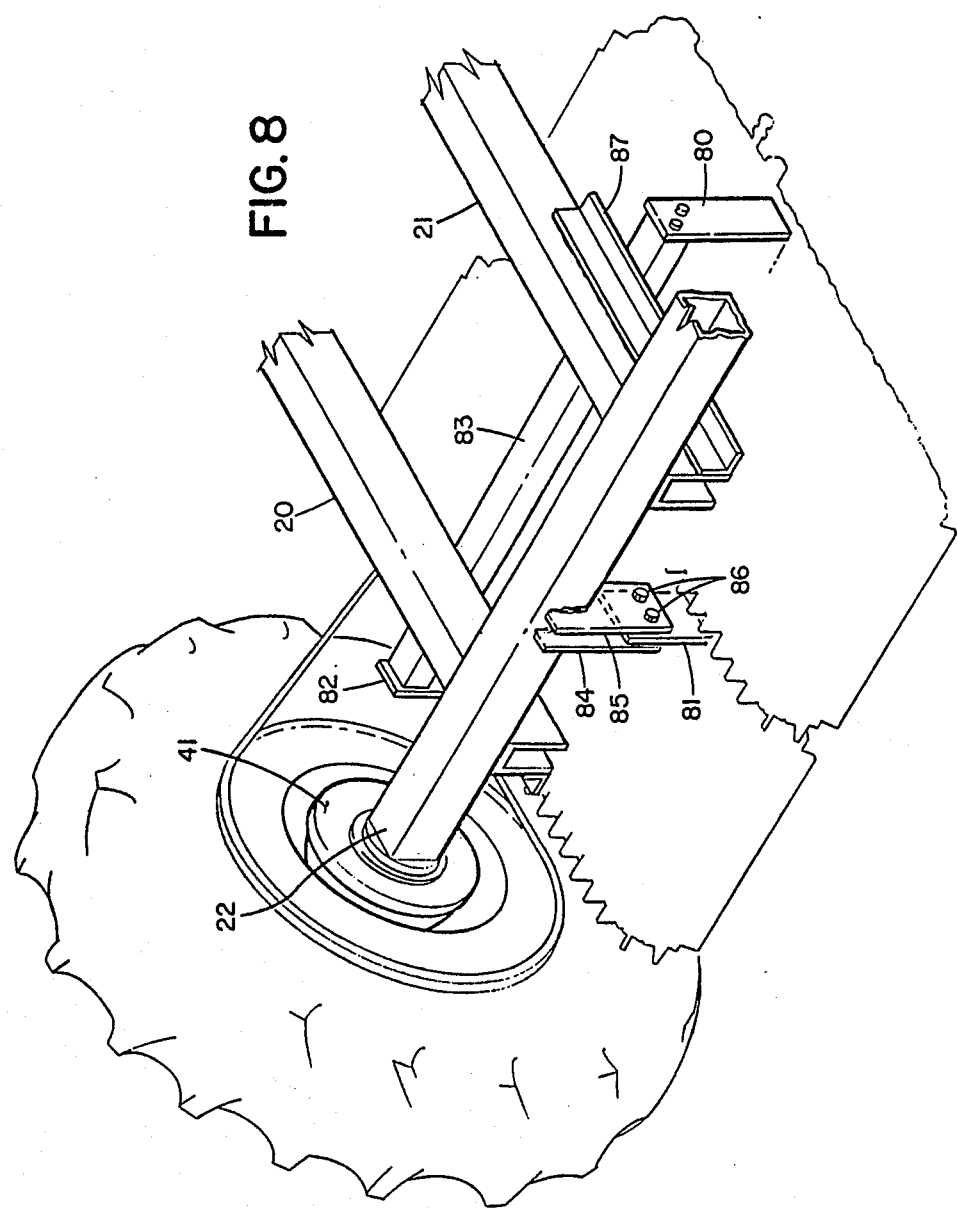
FIG. 8 is a perspective view showing the mounting of the traction unit on the chassis of the tractor.

Referring to FIGS. 1, 2 and 8, the conventional farm tractor has a chassis including the longitudinal beams 20 and 21, and at least one transverse rear beam such as is formed by the axle housing 22. The tractor motor, differential, and transmission delivering power to the axles are not shown. The ends of the axles terminate in flanges 23 to which the hub 24 of the wheel 25 is bolted at the holes shown at 26 in FIG. 2. The power takeoff for driving the endless track unit generally indicated at 27 utilizes a hub attachment incorporating the ring 28 and a group of four legs 29–32 welded to the ring 28, and extending along the inner cylindrical surface of the 23 to terminate in mounting feet 33–36, which are bolted to the mounting face of the wheel 24 as shown at 37–40. This arrangement allows the attachment to reach around the brake housing 41 (shown in FIG. 8). The ring 28 is welded to the large sprocket 42, which places this sprocket sufficiently inside the wheel 25 to accommodate the power-transfer chain 43 extending to the auxiliary traction unit 27.

FIGS. 3 through 7 show the construction of the auxiliary traction unit. The operating mechanism is mounted on a box-shaped frame formed by the upper plate 44, the lower plate 45, and the laterally-spaced web plates 46–49. These components are welded together. Sheets of anti-friction material such as Nylon are secured in any convenient manner to the upper and lower surfaces of this box structure to provide sliding surfaces for the tracks. These skid plates are identified at 50–53. The box structure has end openings receiving the box extensions 54–57. The extensions 56 and 57 are welded, in place, and the extensions 54 and 55 have a slideable telescoping relationship between the adjacent box web plates to provide a tension adjustment for the endless track units 58 and 59 (refer to FIG. 4). The extensions are provided with bearings as shown at 60–67 for supporting the shafts 68–71 carrying the track sprockets 72–79 establishing turns for the endless tracks on horizontal axes, and thus creating upper and lower courses to the endless track sections. The lower course should be four to six inches above hard-surface ground level. The complete assembly is secured to the chassis of the vehicle at three points formed by the legs 80–82 (refer to FIG. 4), the legs 80 and 82 being bolted to the special member 83 welded to the chassis members 20 and 21 (refer to FIG. 8). The leg 81 is received between the tabs 84 and 85 welded to the axle housing 22, and secured by the bolts 86. Reinforcement rails as shown at 87 welded to the chassis members 20 and 21 are optional.

The placement of the traction unit in the front-rear direction should locate the center of the bearing area of the tracks somewhat toward the front wheels of the tractor from the center of the main drive wheels. This arrangement tends to prevent the front wheels from driving into soft ground when towing forces are reduced. The location of the center of bearing area of the tracks a foot or so ahead of the drive wheel axle is usually adequate to remove sufficient weight from the front wheels. It should be noted that the fixed form of the mounting of the traction unit will result in transferring some of the bearing force forward on the tracks if the front of the tractor does begin to nose down. This natural transfer of bearing force is thus a correcting factor tending to further reduce the load on the front wheels.

Figure 6:
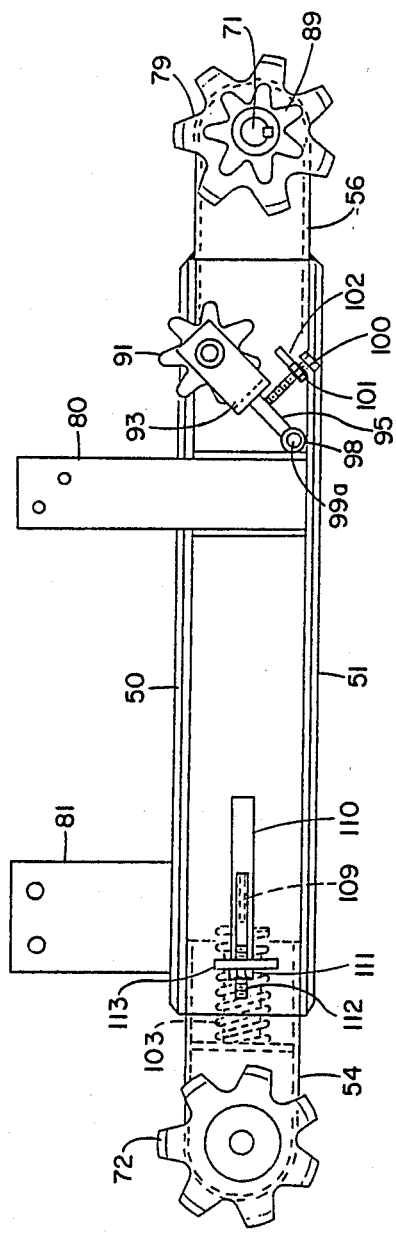
FIG. 6 is a side elevation of the structure shown in FIG. 5.
Figure 7:
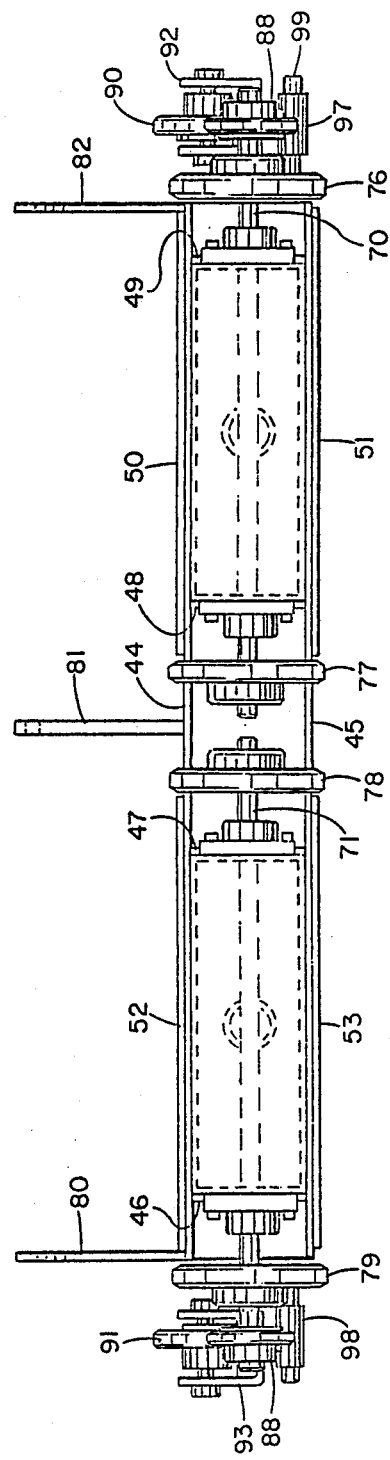
FIG. 7 is a front view of the structure shown in FIGS. 5 and 6.

The power transfer to the auxiliary traction unit is delivered through the chains 43 (on both sides of the vehicle) to the driven sprockets 88 and 89 secured respectively to the shafts 70 and 71. Any movement of the tractor will thus obviously induce movement of the endless track units. Tension on the drive chains 43 is controlled by the positioning of the idler sprockets 90 and 91 carried by the forks 92 and 93 mounted on the radius arms 94 and 95, respectively. These arms are secured to the sleeves 97 and 98, respectively, rotatably received by the cantilever shafts 99 and 99a welded to the box frame. The positioning system for the idler sprockets is best shown in FIG. 6, and includes an adjustment bolt 100 received in a nut 101 welded to a bracket 102 extending from the box frame. Adjustment of the bolt 100 will obviously alter the angular position of the radius arms carrying the sprockets, and thus control the tension in the drive chains. Installation and removal of the drive chains is accomplished by releasing the chain tension and establishing sufficient slack to slip the chain over the teeth of the sprockets.

Control of the tension in the endless tracks involves a biasing action applied to the moveable box extensions 54 and 55. This biasing action is provided by the compression springs 103 and 104 acting between the transverse walls 105 and 106 and the moveable transverse bar 109. This bar moves within slots as shown at 110 in the web plates, and is positioned along these slots by adjustment of the nuts 111 engaging the bolts 112 welded to the opposite ends of the bar 109. The nuts bear against the brackets 113 secured to the box frame. This adjustment appears on both sides of the unit, and obviously alters the degree of compression in the springs 103 and 104.

Figure 10:
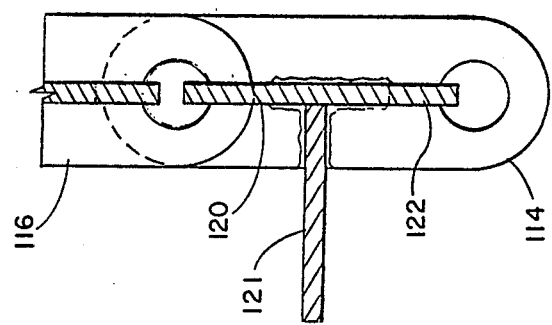
FIG. 10 is a side elevation with respect to FIG. 9.
Figure 9:
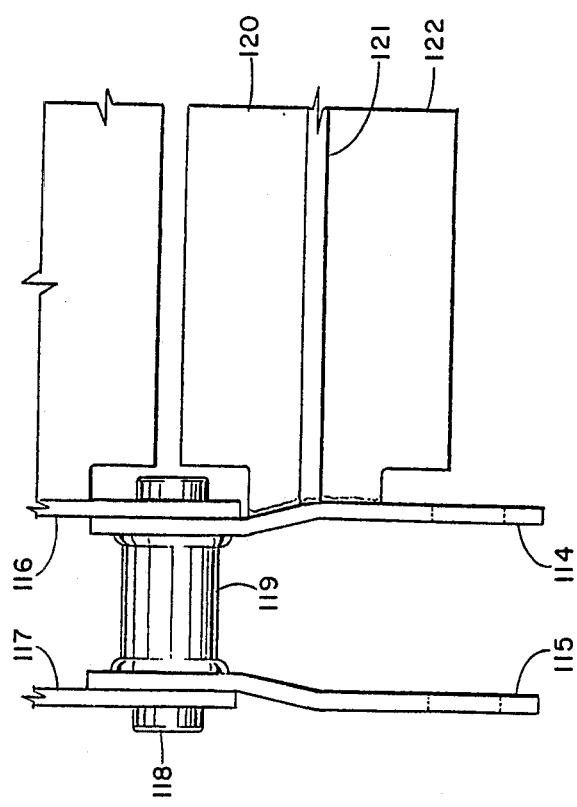
FIG. 9 is a view on an enlarged scale showing one of the track lines.

The structure of the links forming the endless track units is illustrated in FIGS. 9 and 10. A chain is formed on each side of the track by links incorporating spaced straps as shown at 114 and 115 in FIG. 9. These are pivotally connected to the next pair 116 and 117 by a pin 118 carrying the roller 119, which engages the various sprockets. A generally "T"-shaped member 120 is welded at its opposite ends to the inner straps 114. The upstanding portion 121 forms the principal traction source as it digs into soft ground, and is supported by the portion 122, which also acts as a barrier to the accumulation of foreign material into and under the traction units.

I claim:

1. In combination with a vehicle having a chassis and one drive wheel mounted each side of said chassis on a transverse axis, an endless track unit comprising:
    a frame formed by substantially continuous upper and lower plates interconnected by web plates, and having telescoping sections biased to increased overall length of said frame to maintain tension on said tracks, and means normally securing said frame to said chassis;
    a pair of laterally spaced endless tracks each forming a loop surrounding said frame;
    track-locating means establishing turns in each said loop on horizontally spaced axes parallel to said drive wheel axis, said track-locating means including a pair of rollers rotatably mounted on said frame;
    a pair of first sprocket, said first sprockets being each normally secured to said drive wheel;
    a second sprocket, said second sprocket being secured to a respective roller, each of said first and second sprockets having pitch diameters proportioned to induce a track velocity corresponding to the peripheral velocity of said drive wheel; and
    drive chain means engaging said first and second sprockets.

2. A combination as defined in claim 1, wherein said means normally securing said frame includes three brackets at spaced positions on said frame secured to structure fixed with respect to said chassis, one of said brackets being disposed between said tracks.

3. A combination as defined in claim 1, wherein each said drive wheel has a cylindrical interior surface and a mounting surface together defining a cavity, and additionally including a structure securing said first sprocket to said drive wheel, said structure including at least one member extending adjacent said cylindrical and mounting surfaces.

4. A combination as defined in claim 3, wherein said structure includes a ring secured to each said first sprocket, and a plurality of said members secured to said ring.

* * * * *

UNITED STATES PATENT AND TRADEMARK OFFICE
CERTIFICATE OF CORRECTION

PATENT NO. : 4,821,824

DATED : 04-18-89

INVENTOR(S) : Lloyd Gilbert

It is certified that error appears in the above-identified patent and that said Letters Patent is hereby corrected as shown below:

Column 2: line 16, delete "hub" and substitute --wheel--;

line 19, insert --wheel-- before the numeral "23";

line 61, delete "driving" and substitute --diving--;

Column 3: line 9, delete "on" and substitute --in--;

Column 4: Claim 1, line 6, insert --on-- after "mounted";

line 21, delete "first sprocket, said first sprockets being each" and substitute --first sprockets, said each first sprocket being--.

Signed and Sealed this

Twelfth Day of December, 1989

*Attest:*

JEFFREY M. SAMUELS

*Attesting Officer*    Acting Commissioner of Patents and Trademarks